United States Patent [19]

Keene et al.

[11] 3,958,881

[45] May 25, 1976

[54] METHOD OF OPERATING A LASER OSCILLATOR AND AMPLIFIER

[75] Inventors: Wayne H. Keene, Medfield; Christopher R. Miller, South Acton; Arthur A. Chabot, Westford, all of Mass.

[73] Assignee: Raytheon Company, Lexington, Mass.

[22] Filed: Nov. 18, 1970

[21] Appl. No.: 90,526

[52] U.S. Cl. ................................. 356/28; 330/4.3; 331/DIG. 1
[51] Int. Cl.² .................... G01P 3/36; H01S 3/00
[58] Field of Search .............. 330/2.4; 356/28, 4, 356/5, 106 R; 250/199; 331/94.5 A

[56] References Cited
UNITED STATES PATENTS

| | | | |
|---|---|---|---|
| 3,409,369 | 11/1968 | Bickel | 356/28 |
| 3,409,370 | 11/1968 | King et al. | 331/94.5 A |
| 3,476,483 | 11/1969 | Weeks | 356/256 |
| 3,514,207 | 5/1970 | De Lang et al. | 331/94.5 A |

FOREIGN PATENTS OR APPLICATIONS

| | | | |
|---|---|---|---|
| 1,183,492 | 3/1970 | United Kingdom | 356/28 |

*Primary Examiner*—Richard A. Farley
*Assistant Examiner*—S. C. Buczinski
*Attorney, Agent, or Firm*—Philip J. McFarland; Richard M. Sharkansky; Joseph D. Pannone

[57] ABSTRACT

In a laser system, the method of operating a laser simultaneously as an oscillator to produce a beam of coherent light and as an amplifier for backscattered light from targets illuminated by the coherent light in such beam is disclosed.

3 Claims, 2 Drawing Figures

METHOD OF OPERATING A LASER OSCILLATOR AND AMPLIFIER

BACKGROUND OF THE INVENTION

It is well known in the art that a laser may be used to amplify optical signals, provided only that the threshold of laser oscillations is not exceeded. That is, a laser may be used as an amplifier when the product of the total gain of light signals passing through the optical resonator of a laser and the mean reflection coefficients of the resonator end mirrors is less than unity. When such product is greater than unity typical laser oscillations occur, the frequency of such oscillations being dependent upon the particular laser being used.

It has been conventional practice to use a particular laser as either an amplifier or an oscillator. When a laser is used as an oscillator the dimensions of its optical resonator are controlled, by one means or another, to make such resonator a high Q cavity wherein regenerative amplification occurs for light waves of a given wavelength. The Fabry-Perot interferometer incorporating a pair of mirrors, properly aligned and spaced one from the other, is the classical example of an optical resonator. A laser amplifier, however, requires only an optical cavity filled with a medium having an inverted population. As a result, any signal within a proper frequency band may initiate stimulated emission to produce an amplified optical signal.

It is also known to provide an arrangement of lenses and mirrors to separate a beam of coherent light transmitted by a laser from the light backscattered from illuminated targets so that optical heterodyning of such backscattered light may be accomplished. In known arrangements of such type, great care must be taken to maintain the alignment of the various lenses and mirrors to attain satisfactory results. As a matter of fact, the alignment problem is so critical that, except under controlled laboratory conditions, environmental problems, such as vibration, make it extremely dificult to design and make satisfactory systems.

SUMMARY OF THE INVENTION

Therefore, it is a primary object of this invention to provide an improved method of operating a laser as a preamplifier for optical signals and also whereby the high Q cavity of the laser is used to produce a beam of coherent light.

Another object of this invention is to provide an improved method of operating a laser system so that alignment of the elements in the required arrangement of lenses and mirrors is automatically kept at an optimum, regardless of environmental conditions.

These and other objects of this invention are attained generally by operating the laser in an optical generation, transmission, preamplification and detection system to produce a transmitted beam of coherent light and, simultaneously, as an optical amplifier for light reflected and/or scattered from targets illuminated by such transmitted beam.

BRIEF DESCRIPTION OF THE DRAWINGS

For a more complete understanding of this invention, reference is now made to the following description of embodiments of the invention illustrated in the accompanying drawings in which.

DESCRIPTION OF THE PREFERRED EMBODIMENT

Before referring to the FIGS., it should be noted that the word "light" as used herein refers to any coherent electromagnetic radiation in the ultraviolet, visible, infrared or microwave portion of the spectrum. Further, it should be noted that, for ease of exposition, the adaptations of the classical telescope configurations normally used with lasers to define and/or deflect the beam of light from the laser have not been illustrated. Still further, for the reason just mentioned, conventional appurtenances such as power supplies, have not been shown.

Figure 1:
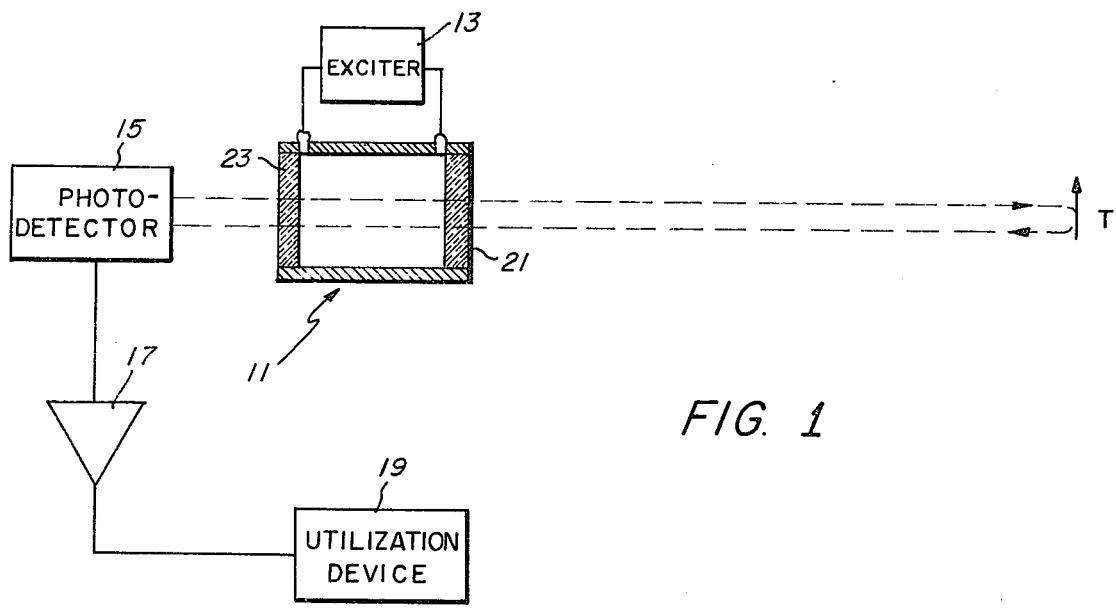
FIG. 1 is a block diagram, greatly simplified, of a first embodiment of a transmit/receive system in which a laser is used to generate a beam of coherent light for transmission and the same laser is used to amplify return signals before detection thereof by a photodetector; and, FIG. 2 is a block diagram, again greatly simplified, of an alternative embodiment of the type of system illustrated in FIG. 1.

Referring now to FIG. 1, structure for carrying out the method of this invention may be seen to consist essentially of a laser 11, an exciter 13 for the laser 11, a photodetector 15, an amplifier 17 and a utilization device 19. The laser 11 here contemplated to be used is a conventional $CO_2$ laser including partially transmissive mirrors 21, 23 defining the end walls of its optical resonator (not numbered). Laser 11 is here operated in the CW mode although it may equally as well be operated in a pulsed mode. The photodetector 15 also is conventional, being any photovoltaic or photoconductive device which produces output electrical signals corresponding to the optical signals impressed upon it. Amplifier 17 and utilization device 19 similarly are conventional to filter, amplify and convert a portion of the electrical signals (here the signals resulting from heterodyning a part of the output signals from the laser 11 and the amplified optical return signals) from the photodetector 15. The partially transmissive mirrors 21, 23 which define the ends of the optical resonator (not numbered) of laser 11 are here conventional optical components having a coefficient of transmissivity from, say, 0.5 to 0.001. The reflecting surfaces of such mirrors are spaced, again in any convenient way, so that the length of the optical resonator is an integral multiple of half wavelengths of the light to be produced.

In operation, the exciter 13 is actuated in any convenient manner to pump the gases in the optical resonator. Lasing transitions occur, thereby exciting the optical resonator and producing a beam of coherent light passing through partially transmissive mirror 23 to the photodetector 15 and a beam of coherent light passing through partially transmissive mirror 21 and through the atmosphere to illuminate targets, as target T. Light reflected back from target T passes through the partially transmissive mirror 21 into the optical resonator of the laser 11 and, after multiple reflections between the partially transmissive mirrors 21, 23, through partially transmissive mirror 23 to the photodetector 15. A moment's thought will make it clear that the multiple reflections of the reflected light which occur within the optical resonator between the partially transmissive mirrors 21, 23 cause a precise constructive interference pattern if the wavelength of the reflected light is the same as the wavelength of the transmitted light. Such a condition obtains when the reflected light is returned from a target, T, having no Doppler velocity. As a result, amplification of the reflected light occurs. While such constructive interference could cause instability, such effect is not here experienced because the product of the gain of the optical resonator and the reflection coefficient of the partially transmissive mirrors 21, 23 is less than unity. On the other hand, if the wavelength of the reflected light differs from the wavelength of the transmitted light, i.e. the reflected light is returned from a target, T, having a Doppler velocity, the dimensions of the optical resonator do not permit a precise interference pattern to be formed. The optical gain of such reflected light, therefore, is less than the optical gain of reflected light from a target without a Doppler velocity. The magnitude of such gain is, of course, a function of the Doppler shift impressed on the reflected light and the Q of the optical resonator.

A portion of the transmitted light is also passed through the partially transmissive mirror 23 to the photodetector 15. The output signals of the latter element, therefore, include electrical signals resulting from the photomixing of the transmitted light and the amplified reflected light. One of such electrical signals is, of course, the difference signals between the two, the frequency of such heterodyne signals being indicative of the Doppler shift caused by motion of the target, T. To filter such difference signals from the other signals out of the photodetector 15, the amplifier 17 includes an appropriate band pass filter.

Figure 2:
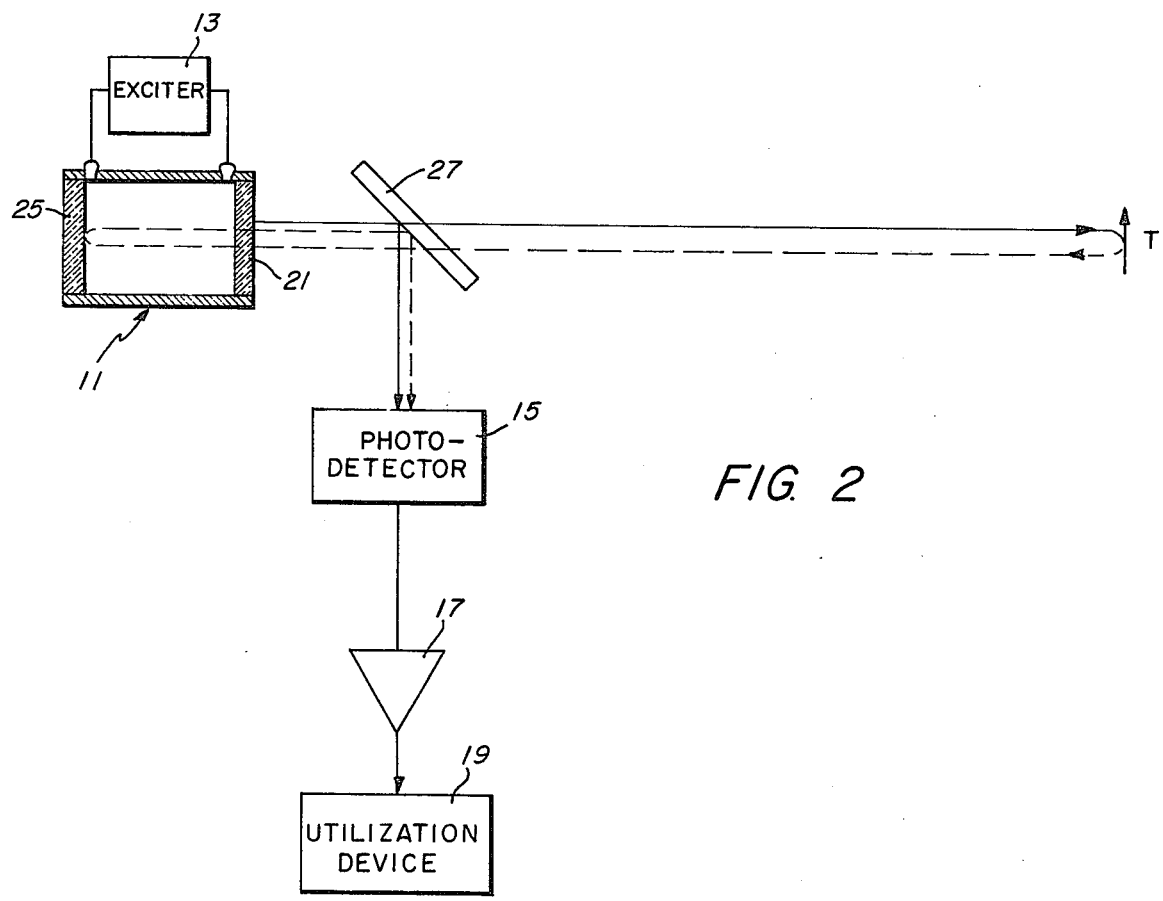

Referring now to FIG. 2, it should be noted elements common to the embodiments shown in FIG. 1 and FIG. 2 are similarly numbered. Thus, the differences between the embodiments are that the partially transmissive mirror 23 (FIG. 1) is replaced by a totally reflective mirror 25 and a beam splitting mirror 27 is added as indicated. The changes just noted convert the embodiment illustrated in FIG. 1 to an embodiment in which a portion of the transmitted light is reflected, by beam splitting mirror 27, to the photodetector 15 and a portion of the reflected signal is amplified by multiple reflections in the optical resonator and then reflected toward the photodetector 15. Optical mixing occurs at the latter element as noted hereinbefore so that the electrical signals out of that element include the difference signals between the transmitted and amplified reflected signals.

Having described two laser systems which operate according to the method contemplated herein, it will become apparent to those of skill in the art that other laser systems may also be operated in a similar manner. For example, the gaseous laser illustrated may be replaced by a liquid or a solid laser if desired. It is felt, therefore, that the invention should not be restricted to its disclosed embodiments but rather should be limited only by the spirit and scope of the appended claims.

What is claimed is:

1. In a laser system wherein backscattered light energy from objects outside such system is optically mixed with a first portion of the coherent light from the optical resonator of a laser to produce modulated optical signals, each one of such signals being indicative of the Doppler velocity of each object illuminated by a second portion of such coherent light, the method of operating such system comprising the steps of:
   a. continuously exciting a laser to produce a first beam of coherent light having a constant power;
   b. dividing, in a partially reflective mirror, such first beam into a second and a third beam, the second beam being directed to a photodetector and the third beam being directed outwardly from the laser;
   c. passing, through the partially reflective mirror to the optical resonator of the laser, backscattered optical energy from objects illuminated by the third beam;
   d. amplifying, in the optical resonator of the laser, only such backscattered optical energy; and,
   e. optically mixing the amplified backscattered optical energy and the coherent light in the second beam.

2. In a laser system wherein backscattered light energy from objects outside such system is optically mixed with a first portion of the coherent light from the optical resonator of a laser to produce modulated optical signals, each one of such signals being indicative of the Doppler velocity of each object illuminated by a second portion of such coherent light, the method of operating such system comprising the steps of:
   a. continuously exciting a laser to produce outside of such laser a first beam of coherent light having a constant power;
   b. dividing, in a partially reflective mirror, such first beam into a second and a third beam, the second beam being directed to a photodetector and the third beam being directed outwardly from the laser;
   c. passing, through the partially reflective mirror to the optical resonator of the laser, backscattered optical energy from objects illuminated by the third beam;
   d. amplifying, in the optical resonator of the laser, only such backscattered optical energy;
   e. optically mixing the amplified backscattered optical energy and the coherent light in the second beam to form a composite beam of optical modulated signals; and
   f. detecting the optical modulated signals to provide an indication of the Doppler velocity of each one of the objects illuminated by the second portion of the coherent light.

3. In a laser system wherein backscattered light energy from objects outside such system is optically mixed with a first portion of the coherent light from the optical resonator of a laser to produce modulated optical signals, each one of such signals being indicative of the Doppler velocity of each object illuminated by a second portion of such coherent light, the method of operating such system comprising the steps of:
   a. continuously exciting a laser to produce from a first end of such optical resonator a first beam of coherent light having a constant power;
   b. dividing, in a partially reflective mirror, such first beam into a second and a third beam, the second beam being directed to a photodetector and the third beam being directed outwardly from the laser;
   c. passing, through the partially reflective mirror to the first end of the optical resonator of the laser, backscattered optical energy from objects illuminated by the third beam;
   d. amplifying, in the optical resonator of the laser, only such backscattered optical energy;
   e. directing at least a portion of such amplified backscattered optical energy from the first end of the optical resonator to the photodetector; and f. optically mixing the directed amplified backscattered optical energy and the coherent light in the second beam.

* * * * *